United States Patent
Tanibe

(10) Patent No.: US 11,853,621 B2
(45) Date of Patent: Dec. 26, 2023

(54) CLOUD PRINTING SYSTEM AND METHOD OF CONTROLLING CLOUD PRINTING SYSTEM FOR TRANSMITTING AUTHENTICATION INFORMATION OF PLURALITY OF USERS ASSOCIATED OF PRINT JOB TO ANOTHER CLOUD PRINTING SYSTEM

(71) Applicant: CANON KABUSHIKI KAISHA, Tokyo (JP)

(72) Inventor: Ryuya Tanibe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/955,899

(22) Filed: Sep. 29, 2022

(65) Prior Publication Data
US 2023/0109350 A1  Apr. 6, 2023

(30) Foreign Application Priority Data
Sep. 30, 2021  (JP) .................................. 2021-160919

(51) Int. Cl.
*G06F 3/12* (2006.01)
*H04N 1/00* (2006.01)

(52) U.S. Cl.
CPC .......... *G06F 3/1204* (2013.01); *G06F 3/1222* (2013.01); *G06F 3/1238* (2013.01); *G06F 3/1259* (2013.01); *G06F 3/1274* (2013.01); *G06F 3/1288* (2013.01); *H04N 1/0097* (2013.01)

(58) Field of Classification Search
USPC .............................................. 358/1.14–1.15
See application file for complete search history.

(56) References Cited

U.S. PATENT DOCUMENTS

| 11,409,483 B2 * | 8/2022 | Yasuda ................ G06F 3/1238 |
| 2012/0229838 A1 * | 9/2012 | Mogaki ................ G06F 21/608 |
| | | 358/1.14 |
| 2014/0036309 A1 * | 2/2014 | Oguma ................ G06F 3/1288 |
| | | 358/1.15 |
| 2016/0364192 A1 * | 12/2016 | Fujii .................. H04N 1/00244 |
| 2018/0027146 A1 * | 1/2018 | Kato .................. H04N 1/00228 |
| | | 358/1.14 |

FOREIGN PATENT DOCUMENTS

JP     2019006054 A     1/2019

* cited by examiner

*Primary Examiner* — Haris Sabah
(74) *Attorney, Agent, or Firm* — ROSSI, KIMMS & McDOWELL LLP

(57) ABSTRACT

According to an aspect of the present disclosure, a cloud printing system is connected to an information processing apparatus via a network, and the cloud printing system comprises: one or more memories storing a set of instructions; and one or more processors that execute the set of instructions to: receive a print job from the information processing apparatus; and if there is a plurality of users permitted to execute the received print job, transmit the received print job to another cloud printing system using authentication information of each of the plurality of users.

8 Claims, 15 Drawing Sheets

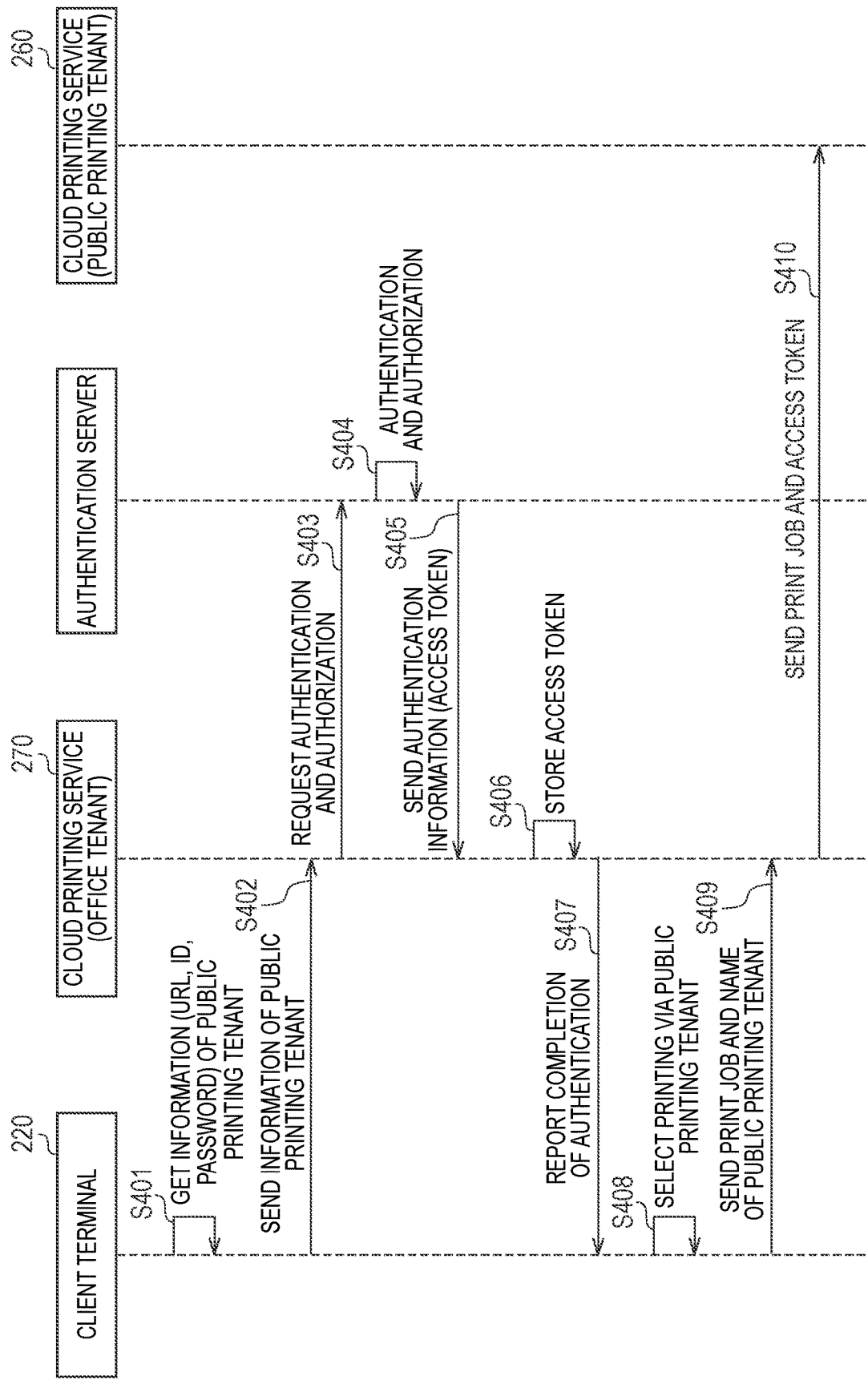

FIG. 13

| JOB LIST | | | | | | | |
|---|---|---|---|---|---|---|---|
| JOB | LEVEL OF SHARING | OPEN PERIOD | SIMPLEX/DUPLEX/BINDING | COLOR | SIZE | PAGES | DATE AND TIME |
| ORDER FORM.PDF | – | | SIMPLEX PRINTING | COLOR | A4 | 2 | 2021/4/9 13:21:45 |
| APPLICATION FORM.PDF | VOLUNTARY | 2021/4/30 | SIMPLEX PRINTING | MONOCHROME | A4 | 3 | 2021/4/10 11:43:29 |
| TRAINING MATERIALS.PDF | NECESSARY | 2021/4/25 | DUPLEX PRINTING | COLOR | A4 | 30 | 2021/4/11 10:15:37 |

[ PRINT ] [ PRINT AND DELETE ] [ DELETE ] [ OPTION ] [ SELECT ALL ] [ UPDATE ] [ RETURN ]

CLOUD PRINTING SYSTEM AND METHOD OF CONTROLLING CLOUD PRINTING SYSTEM FOR TRANSMITTING AUTHENTICATION INFORMATION OF PLURALITY OF USERS ASSOCIATED OF PRINT JOB TO ANOTHER CLOUD PRINTING SYSTEM

BACKGROUND

Field

The present invention relates particularly to a cloud printing system suitable for a system in which multiple cloud printing services collaborate, and a method of controlling the cloud printing system.

Description of the Related Art

In recent years, a cloud printing service, in which a print job is submitted via a cloud and the print job is transmitted to an image forming apparatus, has begun to spread. In order to use such a cloud printing service, it is necessary to register both the image forming apparatus and the client terminal as tenants of the cloud printing service. Here, the tenant is an administrative unit in the cloud printing service, and one or more users belong to the tenant.

The advantage of the cloud printing service is that the print job sent from the client terminal can be executed from any image forming device registered with the tenant, giving the user more freedom in where to execute a printing operation.

Here, in addition to printing by the user who has submitted the print job, there may be a case where the user who has submitted the print job and a plurality of other users want to share the print job and print texts and applications to be used in training. Japanese Patent Application Laid-Open No. 2019-6054 discloses a technique for associating and storing a print job to be shared with account information of a distribution destination when a print job is submitted, and executing the associated shared print job when a user corresponding to the account information of the distribution destination accesses the shared print job. This will allow the document to be distributed to designated users.

In recent years, due to the diversification of work styles, there has been a demand for printing documents stored in client terminals in the company from image forming apparatuses installed in public spaces such as convenience stores, libraries and stations. To achieve this, multiple cloud printing services can work together. Specifically, for example, a printing system in which a cloud printing service connected to an in-house client terminal, an in-house image forming apparatus, or the like and a cloud printing service connected to a client terminal, an image forming apparatus, or the like in a public environment cooperate is configured.

According to the technique disclosed in Japanese Patent Application Laid-Open No. 2019-6054, when a print job is submitted and printed using an account managed by the image forming apparatus, since the account information to be handled is common, the print job can be shared with a user designated at the time of submitting the print job.

However, in a printing system in which a plurality of cloud printing services (hereinafter referred to as "CPS") cooperate, since the CPS for submitting a print job and the CPS for executing the print job are different, common account information may not be used. More specifically, since the account information specified as the sharing target at the time of submitting the print job and the account information at the time of printing are managed by different CPSs, the correspondence between the print job and the account information cannot be made at the time of submitting the print job, and the print job cannot be shared.

To link accounts managed by multiple CPSs, each CPS tenant must enter the account information of the CPS tenant with which it will be linked. Alternatively, it is necessary to provide a service or the like for linking each account, input each account information for each user, and perform a registration operation for linking the accounts. When sharing print jobs with the cloud printing service, it takes a lot of work for users to connect their account information.

In view of the aforementioned problems, it is an object of the present invention to reduce an input operation of account information when multiple users share a print job in a printing system in which multiple cloud printing services cooperate with each other.

SUMMARY

According to an aspect of the present disclosure, a cloud printing system is connected to an information processing apparatus via a network, and the cloud printing system apparatus comprises: one or more memories storing a set of instructions; and one or more processors that execute the set of instructions to: receive a print job from the information processing apparatus; and if there is a plurality of users permitted to execute the received print job, transmit the received print job to another cloud printing system using authentication information of each of the plurality of users.

Further features of the present invention will become apparent from the following description of exemplary embodiments with reference to the attached drawings.

BRIEF DESCRIPTION OF THE DRAWINGS

FIG. 4 is a sequence diagram showing an example of an authentication process flow from an office tenant to a public printing tenant.

FIG. 13 shows an example of a screen displaying a list of print jobs and shared print jobs.

DESCRIPTION OF THE EMBODIMENTS

The embodiments of the present invention will now be described with reference to the drawings. The following embodiment does not limit the present invention recited in claims, and not all of the combinations of features described in the embodiment are essential for achieving the objective of the invention.

<System Configuration>

Figure 1:
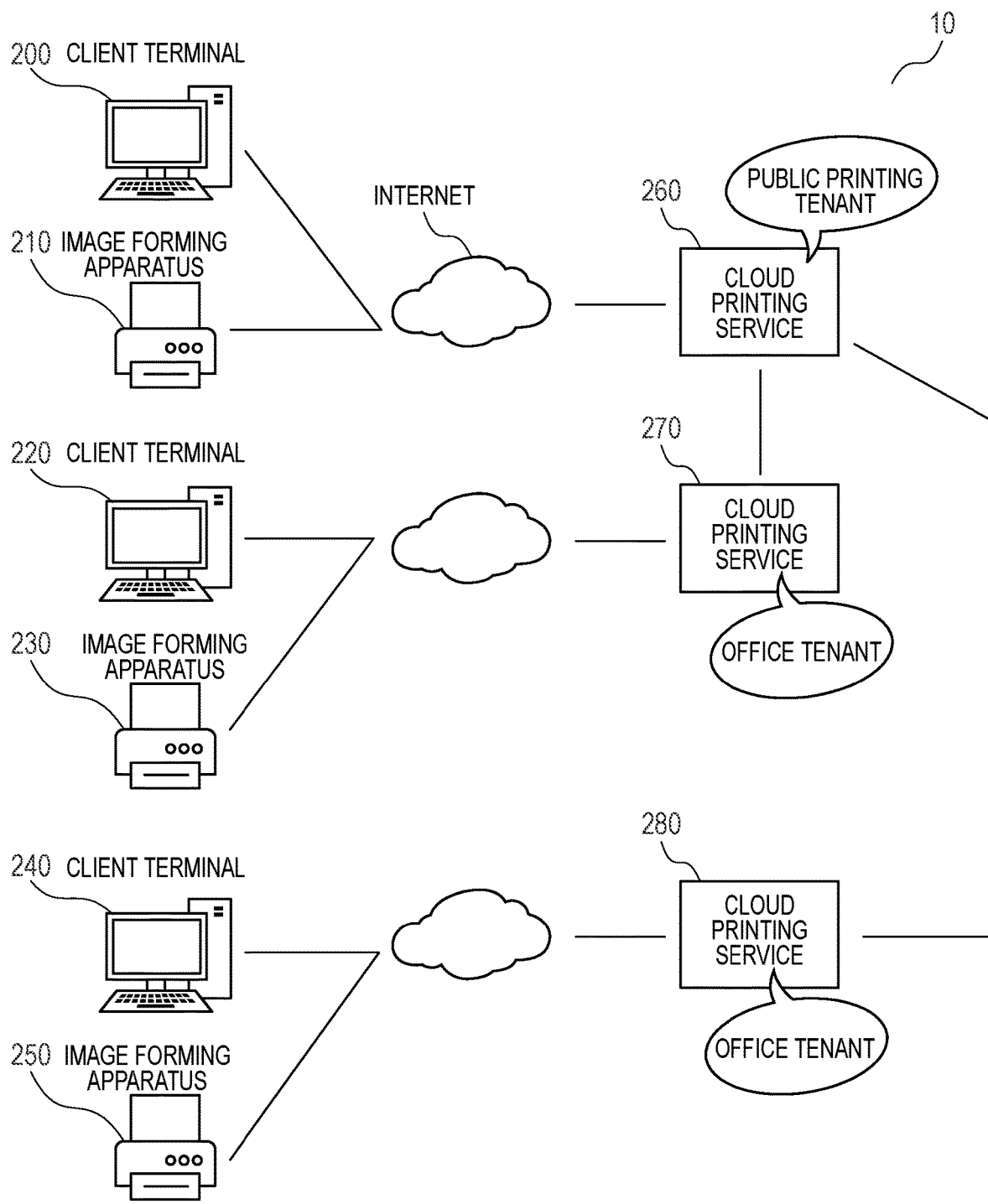
FIG. 1 shows an exemplary configuration of a printing system according to the embodiment.

FIG. 1 is a diagram showing an example of the configuration of a printing system 10 according to the present embodiment.

The printing system 10 includes client terminals 200, 220, and 240, image forming apparatuses 210, 230, and 250, and CPSs 260, 270, and 280.

The client terminals 200, 220, and 240 are operable to send print jobs to the CPSs 260, 270, and 280, respectively. The image forming apparatuses 210, 230, and 250 are operable to obtain a print job from the CPS 260, 270, and 280 and to execute print processing, respectively.

The CPSs 270 and 280 are operable to receive print jobs from the client terminals 220 and 240 and to transmit print result logs to the CPS 260, respectively. The CPS 260 is operable to receive print jobs from the CPSs 270 and 280 and to receive print result logs from the image forming apparatus 210.

The image forming apparatus 210 is installed in a public space such as a library or a train station and is registered in the CPS 260 including a public printing tenant. The client terminals 220 and 240 installed in the internal office are registered in the CPSs 270 and 280, respectively, which have an office tenant.

In the present embodiment, the public printing tenant refers to a cloud printing system (service agency) that manages client terminals and image forming apparatuses installed in a public environment. The office tenant refers to a cloud printing system that manages client terminals and image forming apparatuses installed in a company or an office.

A process for transmitting a print job by using the CPS will be described with reference to FIG. 2.

First, an administrator registers image forming apparatuses 120 and 130 to a tenant of a CPS 110 to which the administrator belongs. The administrator manages resources such as image forming apparatuses for each tenant.

In addition, users who actually use the image forming apparatus create an account for the tenant and register a client terminal 100 to the tenant. This allows the client terminal 100 to send a print job to the image forming apparatuses 120 and 130 via the CPS.

The components shown in FIG. 1 are communicatively connected by a network. The network is, for example, a LAN such as the Internet, a WAN, a telephone line, a dedicated digital line, an ATM system or the like, or a communication network realized by a combination thereof. The network only needs to be able to send and receive data.

In the configuration shown in FIG. 1, in order for the image forming apparatus 210 installed in a public space to obtain the print job submitted from the client terminals 220 and 240 and to execute printing, the print job must be sent to the public printing tenant via the office tenant. One of the methods to realize the transmission of print jobs is to use an authentication and authorization mechanism such as OAuth.

An example of processing for transmitting a print job from an office tenant to a public printing tenant using the authentication and authorization mechanism will be described with reference to the sequence diagram of FIG. 4. The processing of this sequence is initiated by the user entering the information of the tenant that the user wants to perform the authentication process in the client terminal 220. The tenant information that the user enters may be a tenant URL, ID, or password. In the present embodiment, it is considered that the user has entered information of a public printing tenant managed by the CPS 260.

First, in step S401, the client terminal 220 obtains information about the public printing tenant input by the user through an input device 506 described later.

In step S402, the client terminal 220 transmits information of the public printing tenant obtained in step S401 to the CPS 270.

In step S403, the CPS 270 transmits the information of the public printing tenant received from the client terminal 220 and the authentication request to an authentication server. In step S404, the authentication server performs an authentication process based on the received information. If the authentication process is successful, in step S405, the authentication server sends an access token to the CPS 270. The access token represents an example of authentication information.

In step S406, the CPS 270 stores the access token received from the authentication server. In step S407, the CPS 270 notifies the client terminal 220 that the authorization has been completed.

Then, the client terminal 220 displays a list of public printing tenants that have performed the processes of steps S401 to S407 in a display device 507 described later, and the user selects a tenant from the list to execute printing. Here, it is considered that the public printing tenant managed by CPS 260 is selected.

In step S408, the client terminal 220 receives a selection of the public printing tenant sending a print job from the user via the input device 506.

In step S409, the client terminal 220 sends the print job and information of a name of the public printing tenant specified in step S408 to the CPS 270.

In step S410, the CPS 270 transmits the print job together with the access token held for the CPS 260.

As described above, the authentication and authorization mechanism enables to send and receive secure information called print jobs between external tenants. In the above-described sequence diagram, the client terminal 220 may be the client terminal 240, and the CPS 270 may be the CPS 280. The same applies to the sequence diagrams and flowcharts described below.

Performing the authentication mechanism to send print jobs allows to display a list of print jobs associated with the user upon logging in to the image forming apparatus 210 registered to the public printing tenant. Selecting a print job from the list allows the image forming apparatus 210 to execute the print job input from the client terminals 220 and 240.

<Hardware Configuration>

Figure 5A:
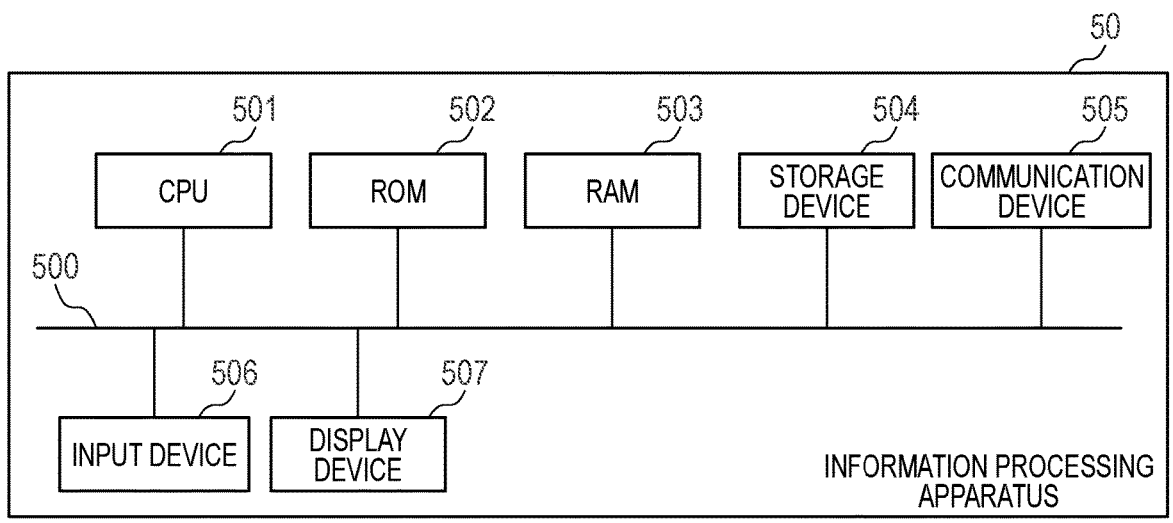
FIG. 5A is a block diagram showing an example of a hardware configuration of an information processing apparatus and an image forming apparatus.

FIG. 5A is a block diagram showing an example of hardware configuration of an information processing apparatus 50 according to the present embodiment. The client terminals 200, 220 and 240 shown in FIG. 2 are examples of the information processing apparatus 50. Server computers constituting the cloud printing system as CPSs 260, 270 and 280 are also examples of the information processing apparatus 50.

The information processing apparatus 50 includes a CPU 501, a ROM 502, a RAM 503, a storage device 504, a communication device 505, the input device 506, and the display device 507.

The CPU 501 integrally controls the entire hardware and controls each unit connected to a bus 500 to execute functions such as printing and scanning.

The ROM 502 is a read-only memory for only reading out data, and stores, for example, a basic control program of the information processing apparatus.

The RAM 503 is a memory capable of reading/writing data, and is used, for example, as a working memory of the CPU 501.

The storage device 504 is used as a storage area for temporary data during execution of each program and permanent data. For example, although an HDD is often used, the storage device 504 may be an SSD or a device capable of reading/writing data by loading a CD, a DVD, or a memory card.

The communication device 505 connects the client terminals 200, 220, and 240, the image forming apparatuses 210, 230, and 250, and the CPSs 260, 270, and 280 to a LAN or the Internet, and enables data communications using TCP/IP between these devices.

The input device 506 is an operation unit for receiving input operations of characters and data by a user. For example, the input device 506 may be a keyboard, a mouse, a hard key, or a touch panel.

The display device 507 is operable to display various screens. The display device may be, for example, a liquid crystal display or a touch panel. On the user interface screen displayed on the display device 507, the user gives an instruction via the input device 506. The instruction may be, for example, an instruction to execute a job.

Figure 2:
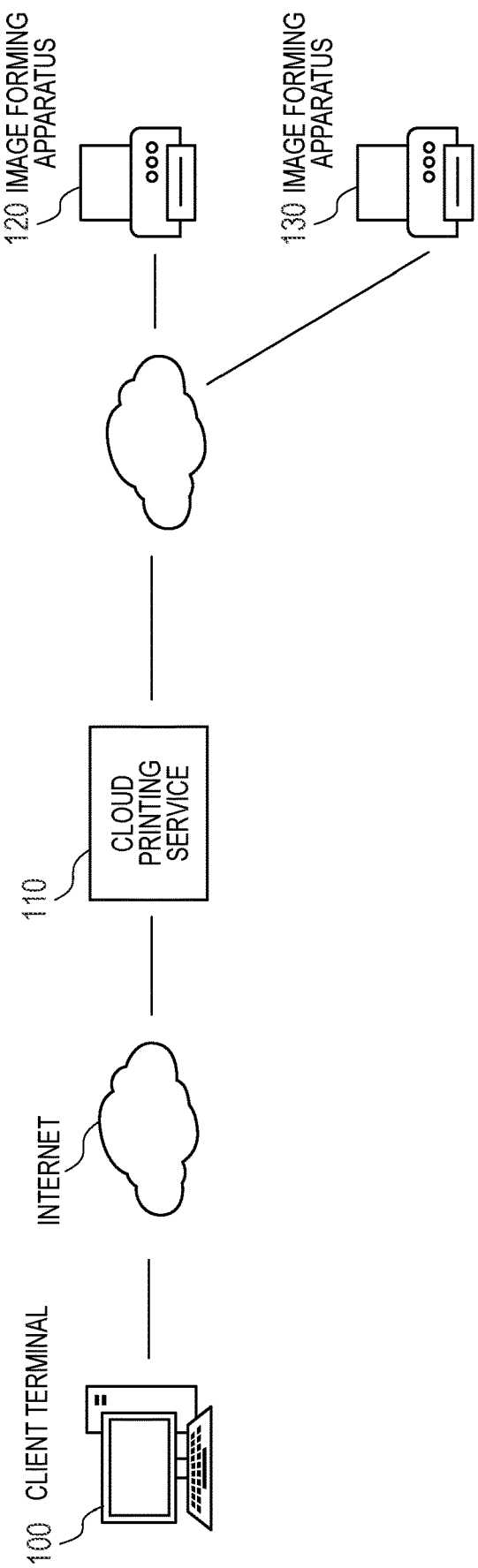
FIG. 2 shows processes for sending a print job using a cloud printing service.
Figure 5B:
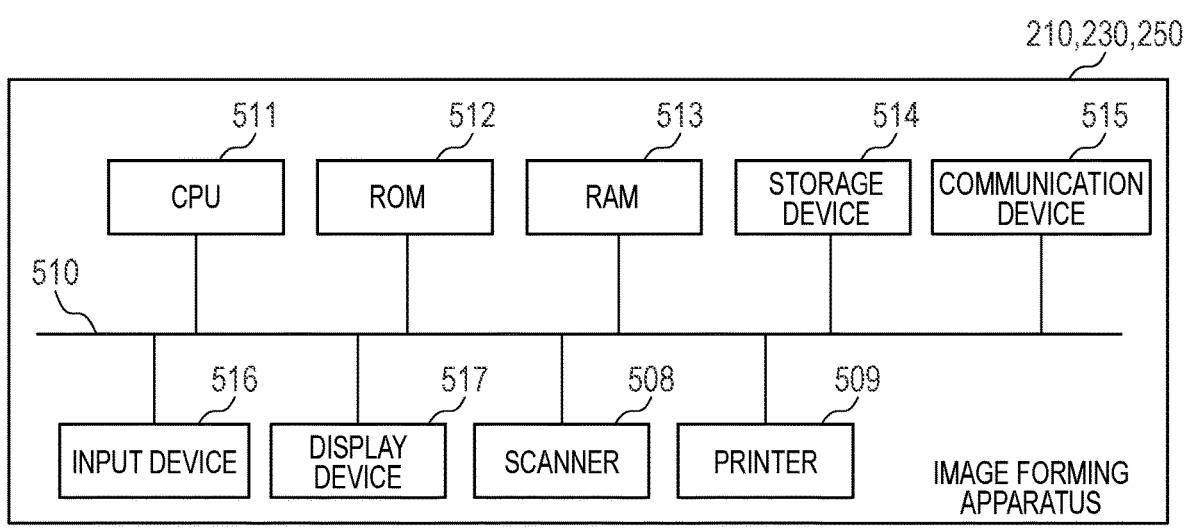
FIG. 5B is a block diagram showing an example of a hardware configuration of an information processing apparatus and an image forming apparatus.

FIG. 5B is a block diagram showing an example of hardware configuration of the image forming apparatuses 210, 230, and 250 shown in FIG. 2.

The image forming apparatuses 210, 230, and 250 include a CPU 511, a ROM 512, a RAM 513, a storage device 514, a communication device 515, an input device 516, a display device 517, a scanner 508, and a printer 509. These components are connected to each other via a bus 510.

The CPU 511, the ROM 512, the RAM 513, the storage device 514, the communication device 515, the input device 516, and the display device 517 are same as the components of the client terminals 200, 220, and 240 described above, and their descriptions are omitted.

The scanner 508 is a device for acquiring a document image in an image data format by scanning a paper document or the like.

The printer 509 is a device for outputting image data related to a document image to an output medium such as a paper medium.

<Functional Configuration>

Figure 3:
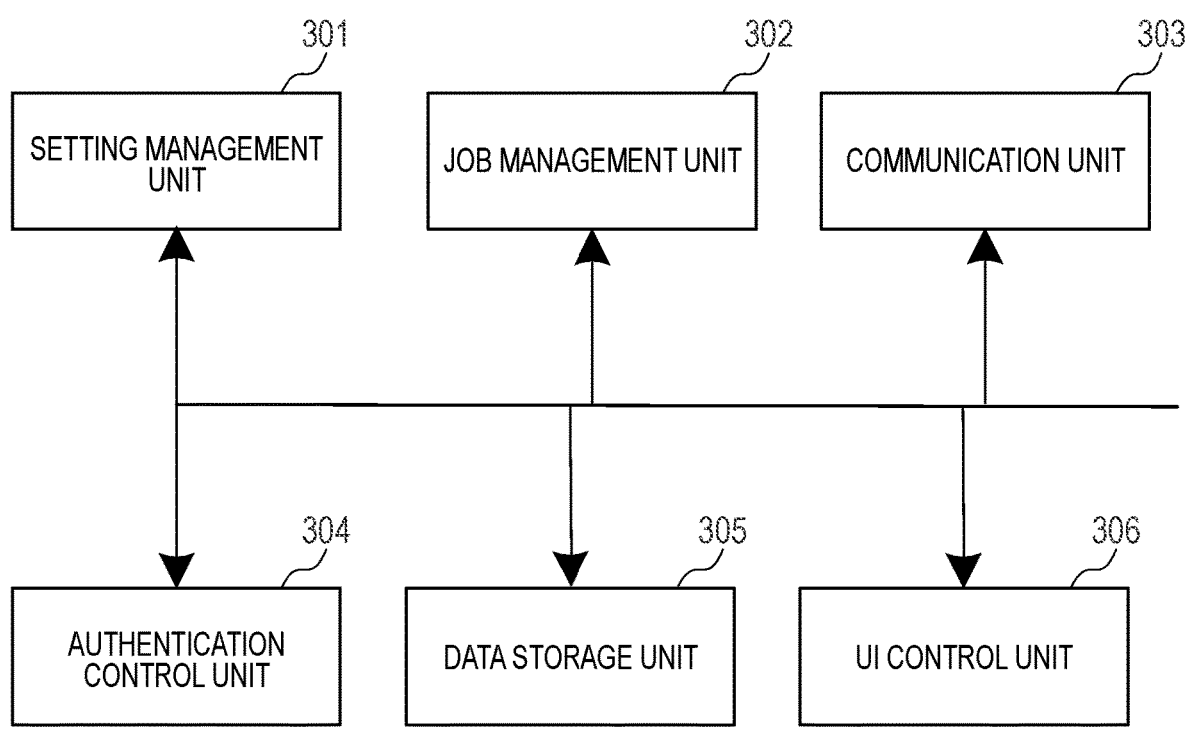
FIG. 3 is a block diagram showing an example of a functional configuration of the cloud printing service according to the embodiment.

FIG. 3 is a block diagram showing an example of the functional configuration of the CPSs 260, 270, and 280 according to the present embodiment. Each configuration shown in FIG. 3 is a function implemented by one or more devices constituting the cloud printing system.

Each of the CPSs 260, 270, and 280 has a setting management unit 301, a job management unit 302, a communication unit 303, an authentication control unit 304, a data storage unit 305, and a UI control unit 306.

The setting management unit 301 stores and reads out settings related to various CPS functions in the data storage unit 305. The job management unit 302 stores a print job received from a client device or from other CPS in the data storage unit 305.

The communication unit 303 transmits and receives various data to and from other CPSs and image forming apparatuses.

The authentication control unit 304 performs processing related to the authentication of the CPS. Specifically, the authentication control unit 304 executes the processes of steps S403 and S406 shown in FIG. 4.

The UI control unit 306 controls information to be displayed in the UI.

<Print Execution Flow>

Figure 6:
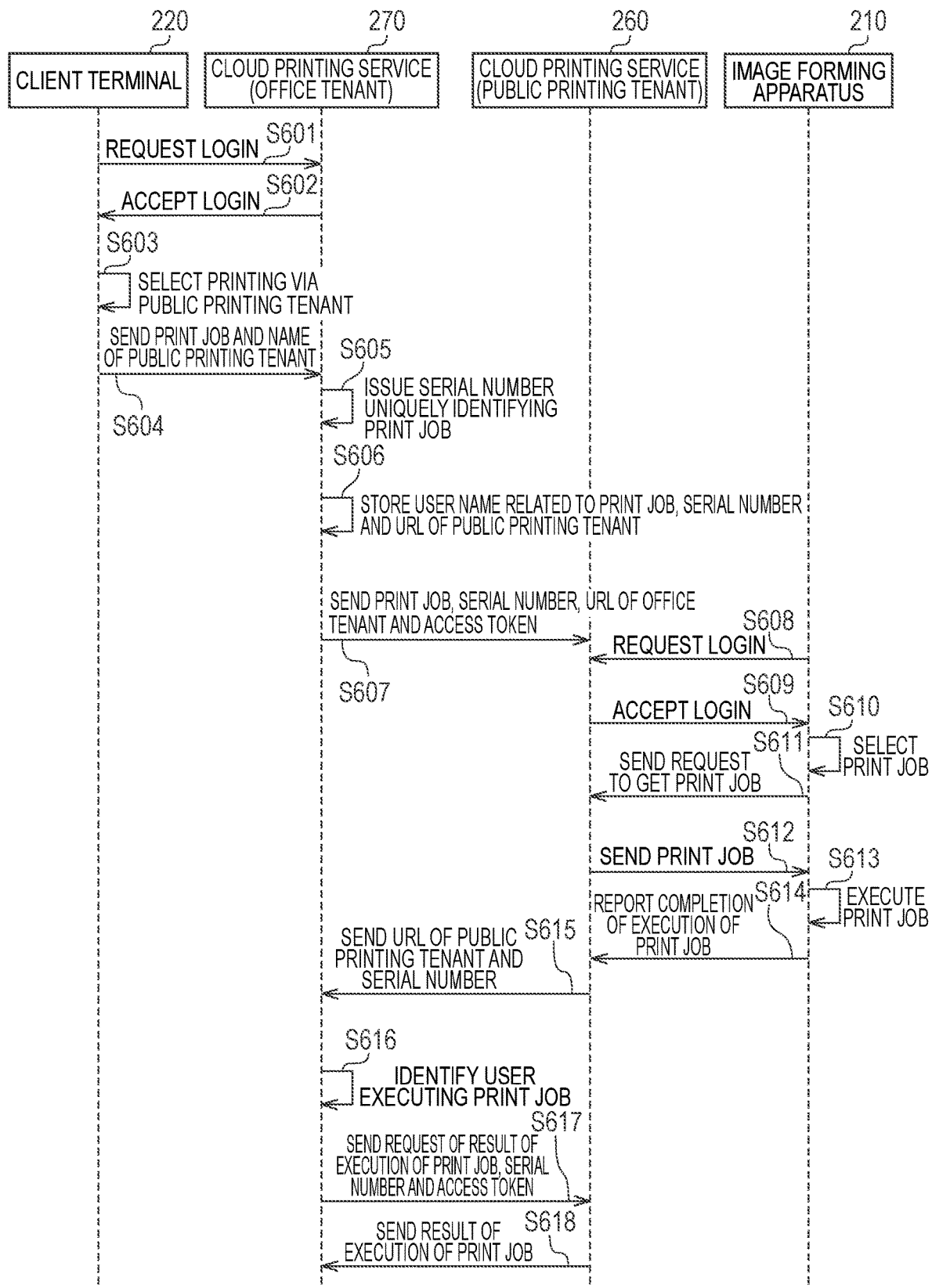
FIG. 6 is a sequence diagram showing an example of a printing process of the printing system according to the embodiment.

FIG. 6 is a sequence diagram showing an example of processing procedure in which a user prints out a document stored in the client terminal 220 of the company by using the image forming apparatus 210 installed in a public space, and then obtains a result of print job execution in the CPS 270 having an office tenant. It is considered that the authorization has been completed according to the authorization sequence shown in FIG. 4, and the print job can be transmitted from the CPS 270 to the CPS 260. The processing of this sequence is initiated by the user entering information for login to the CPS 270 in the client terminal 220. The information for login to the CPS may be an account name of the user or a password, for example.

First, in step S601, the client terminal 220 transmits to the CPS 270 the information for login to the CPS 270 input by the user together with a login request.

In step S602, the CPS 270 collates the information for login transmitted from the client terminal 220, and transmits login permission to the client terminal 220 if determined that the login request is permissible as a result of the collation.

Figure 7:
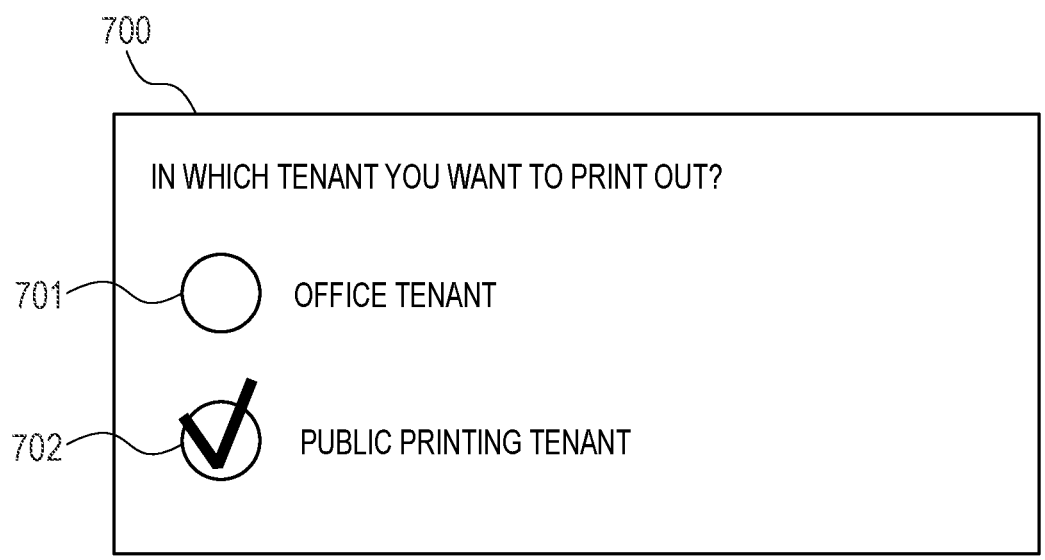
FIG. 7 shows an example of a screen for selecting a tenant that executes printing.

The client terminal 220 then controls the display device 507 to display a screen for selecting a tenant as shown in FIG. 7, and the user selects a tenant to perform printing. In the example of FIG. 7, the display device 507 displays a tenant selection screen 700 showing tenants that can perform printing, and the user can select a tenant using radio buttons 701 and 702. It is assumed that the user checks the radio button 702 to select performing printing via the public printing tenant managed by the CPS 260.

In step S603, the client terminal 220 obtains information about the tenant performing printing based on the user's selection. In this example, the information about the public printing tenant is obtained as the tenant that executes printing.

In step S604, the client terminal 220 transmits a print job together with a name of the selected public printing tenant to the connected CPS 270.

In step S605, the job management unit 302 of the CPS 270 issues a serial number that uniquely identifies the print job within the CPS 270.

In step S606, the job management unit 302 of the CPS 270 associates a name of the user who inputs the print job, the issued serial number, and a URL of the CPS 260, and stores the associated information in the data storage unit 305. Here, the URL of the CPS 260 is the URL input in step S401 of the authorization sequence shown in FIG. 4. Table 1 shows an example of the information stored in step S606. It can be seen that the user name "User01" has transmitted a print job numbered "000001" to "https://tenantA.com".

TABLE 1

| User name | number of print job | URL of print job destination |
|---|---|---|
| User01 | 000001 | https://tenantA.com |
| User01 | 000002 | https://tenantB.com |
| User02 | 000003 | https://tenantA.com |

In step S607, the communication unit 303 of the CPS 270 transmits the print job, the serial number, and the URL of the CPS 270 to the CPS 260 along with the access token held by the CPS 270. The access token held by the CPS 270 is an access token obtained by the processing shown in FIG. 4. Therefore, if the CPS 270 does not hold the corresponding access token at the time of step S607, it is necessary to perform the processes of steps S403 to S406 shown in FIG. 4 before performing the process of step S607.

The user then moves to the front of the image forming apparatus 210 installed in the public space, and inputs to the image forming apparatus 210 information for login to the CPS 260.

In step S608, the image forming apparatus 210 obtains the login information input by the user and transmits a login request to the CPS 260. In step S609, the communication unit 303 of the CPS 260 transmits login authentication to the image forming apparatus 210.

The user then selects a print job to be executed. Here, it is considered that a print job transmitted from the CPS 270 to the CPS 260 is selected.

In step S610, the image forming apparatus 210 obtains a print job to be executed based on an input from the user.

In step S611, the image forming apparatus 210 transmits a request to obtain the print job selected in step S610 to the CPS 260.

Figure 8:
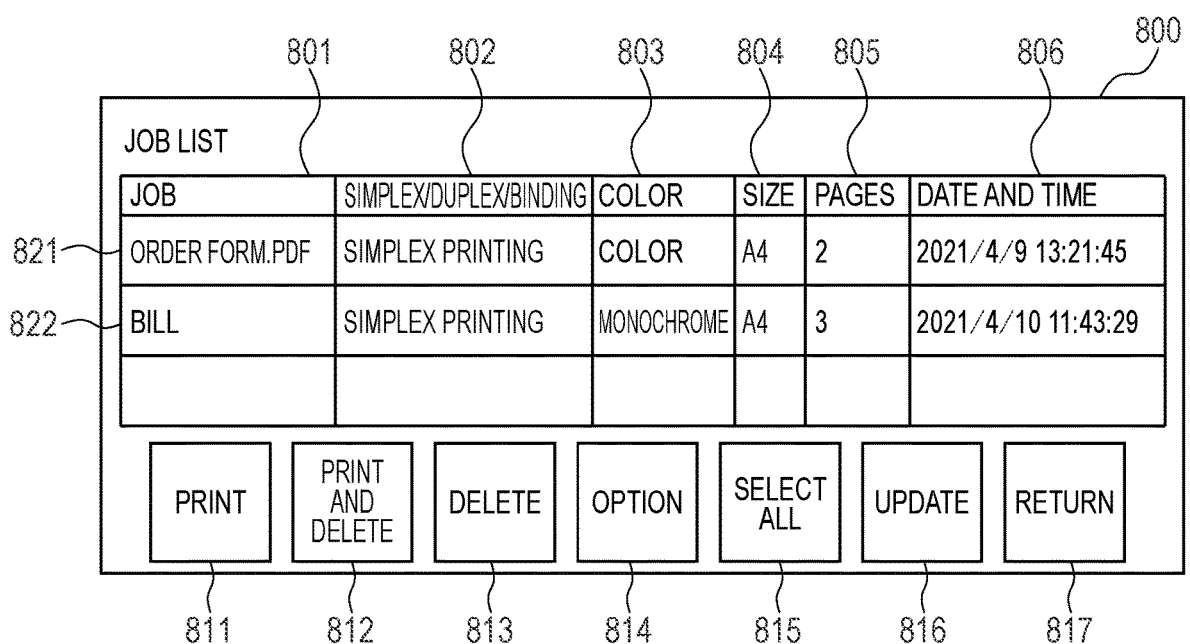
FIG. 8 shows an example of a screen displaying a list of print jobs.

In step S612, the communication unit 303 of the CPS 260 receives a request for obtaining a print job from the image forming apparatus 210, and transmits the requested print job to the image forming apparatus 210. FIG. 8 is a diagram showing an example of a screen when displaying the print job obtained from the CPS 260 on the display device 517 of the image forming apparatus 210. A print job list screen 800 is a UI for displaying a list of print jobs obtained from the CPS 260.

Each of print jobs 821 and 822 indicates a print job obtained from the CPS 260, and a job name 801, a print format 802, a color 803, a size 804, a number of pages 805, and a print job input date and time 806 are displayed for each print job. The print jobs 821 and 822 are in a selected state if the user selects a print job, and the selected print job shows the selected state by changing colors, for example, as shown in the print job 822.

An option button 814 is used for displaying an option setting screen such as a print setting screen. A select-all button 815 is used for selecting all print jobs. An update button 816 is used for performing steps S611 and S612 to display a status of the latest print job.

A return button 817 is used for terminating the print job list screen 800 and returning to a previous screen. A print button 811, a "print+delete" button 812, and a delete button 813 can be pressed while the print job is selected. The print button 811 is used for printing the selected print job, and the print job remains undeleted after printing. The "print+delete" button 812 is used for printing the selected print job, and the print job is deleted after printing. The delete button 813 is used for deleting the selected print job.

In step S613, the image forming apparatus 210 executes the print job to perform printing.

The printing is executed by pressing the print button 811 or the "print+delete" button 812 while selecting the print job on the print job list screen 800.

In step S614, the image forming apparatus 210 notifies the CPS 260 that the execution of the print job has been completed.

In step S615, the communication unit 303 of the CPS 260 transmits information of the serial number of the print job that has been executed and the URL of the CPS 260 to the URL of the CPS 270 received in step S607.

In step S616, the job management unit 302 of the CPS 270 uses the received serial number and the URL of the CPS 260 to identify the user who executed the print job. How to identify the user will be described later.

In step S617, the communication unit 303 of the CPS 270 transmits a request of a result of the print job execution to the CPS 260 together with the access token held by the user identified in step S616 and the serial number received in step S616.

In step S618, the communication unit 303 of the CPS 260 transmits to the CPS 270 the result of the execution of the print job corresponding to the received serial number.

By the above sequence, the result of the print job execution can be transmitted from the CPS 260 to the CPS 270 without performing the authentication processing between the CPS 260 and the CPS 270.

<Print Job Sharing Flow>

Next, with reference to FIGS. 9 to 14, a flow of processing for sharing a print job with other users in the cloud printing service will be described.

This processing is started by the user inputting information to log in the CPS 270 via the client terminal 220. The processes from the step of the client terminal 220 sending a login request to the step of obtaining the information of the tenant in which printing instructed by the user is performed are same as the processes shown in steps S601 to S603 of FIG. 6. Thus, the descriptions thereof are omitted.

Figure 9:
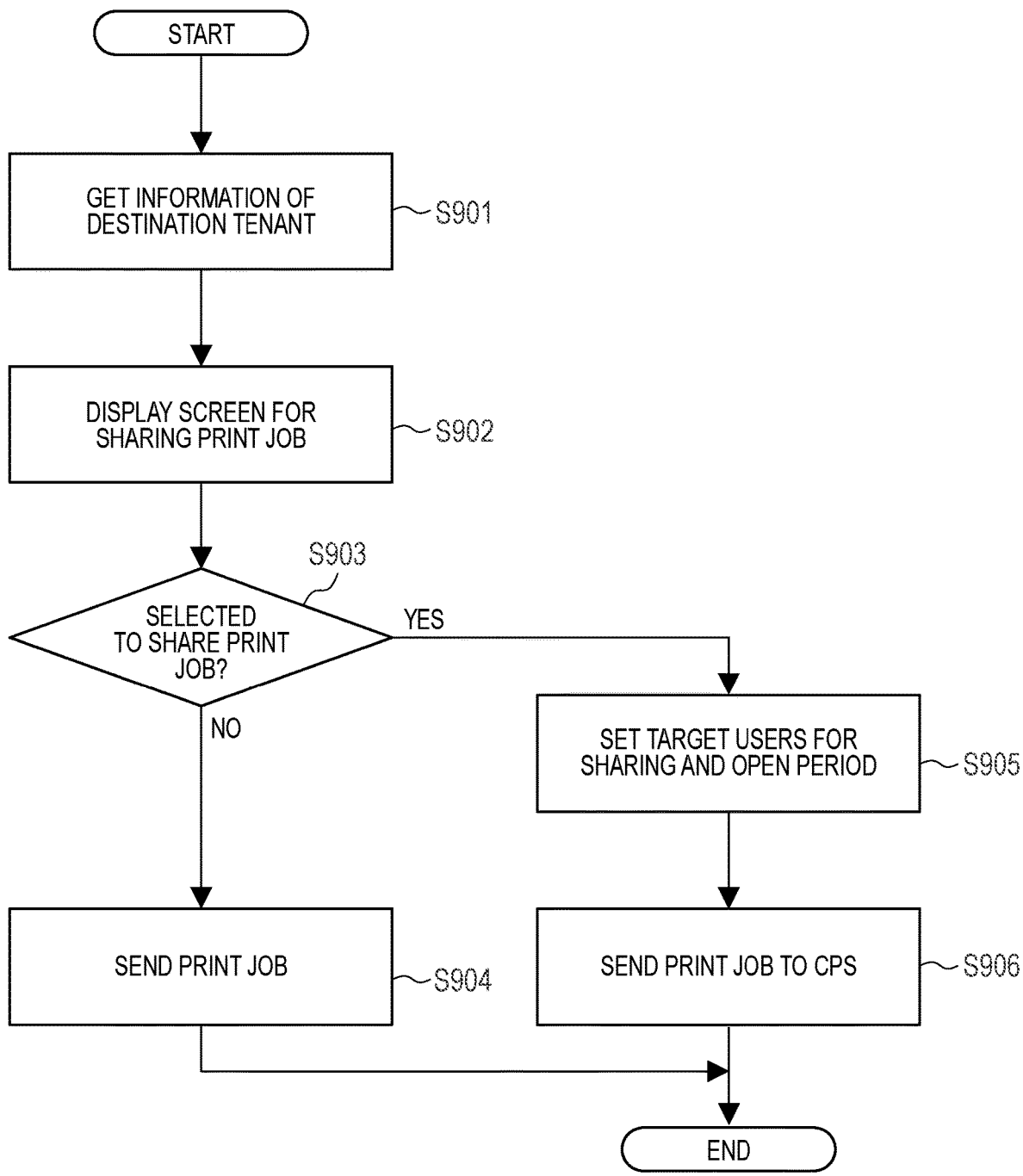
FIG. 9 is a flowchart showing an example of a process for sharing a print job according to the embodiment.

FIG. 9 is a flowchart showing an example of processing executed by the client terminal 220 for sharing a print job with other users in the cloud printing service. The first process of this flowchart is started after the execution of step S603 of FIG. 6. Each of the processes shown in FIG. 9 is performed under the control of the CPU 501 of the client terminal 220.

In step S901, the client terminal 220 obtains information of the tenant executing the printing operation via an input from the user. It is considered that a public printing tenant managed by the CPS 260 is selected as the tenant performing the printing operation.

In case that an office tenant managed by the CPS 270 is selected, the client terminal 220 transmits a print job to the CPS 270. The transmitted print job is stored in the data storage unit 305 by the job management unit 302 of the CPS 270, and then the printing operation is executed by the image forming apparatus 230 installed inside the office or company.

In step S902, the client terminal 220 displays on the display device 507 a selection screen (not shown) for selecting whether to share the print job with other users or to not share the print job for executing the printing operation only for the user. The user then selects whether or not to share the print job.

In step S903, the client terminal 220 determines the selection of the user. If the client terminal 220 determines that the user selected to share the print job with other users, the process proceeds to step S905. On the other hand, if the client terminal 220 determines that the user selected to perform the printing operation only for the user, the process proceeds to step S904.

In step S904, the client terminal 220 transmits the print job in response to the selection of the user such that the print operation is executed by only the user. The above transmission process in step S904 corresponds to the process in step S604 of FIG. 6 described above.

Figure 10:
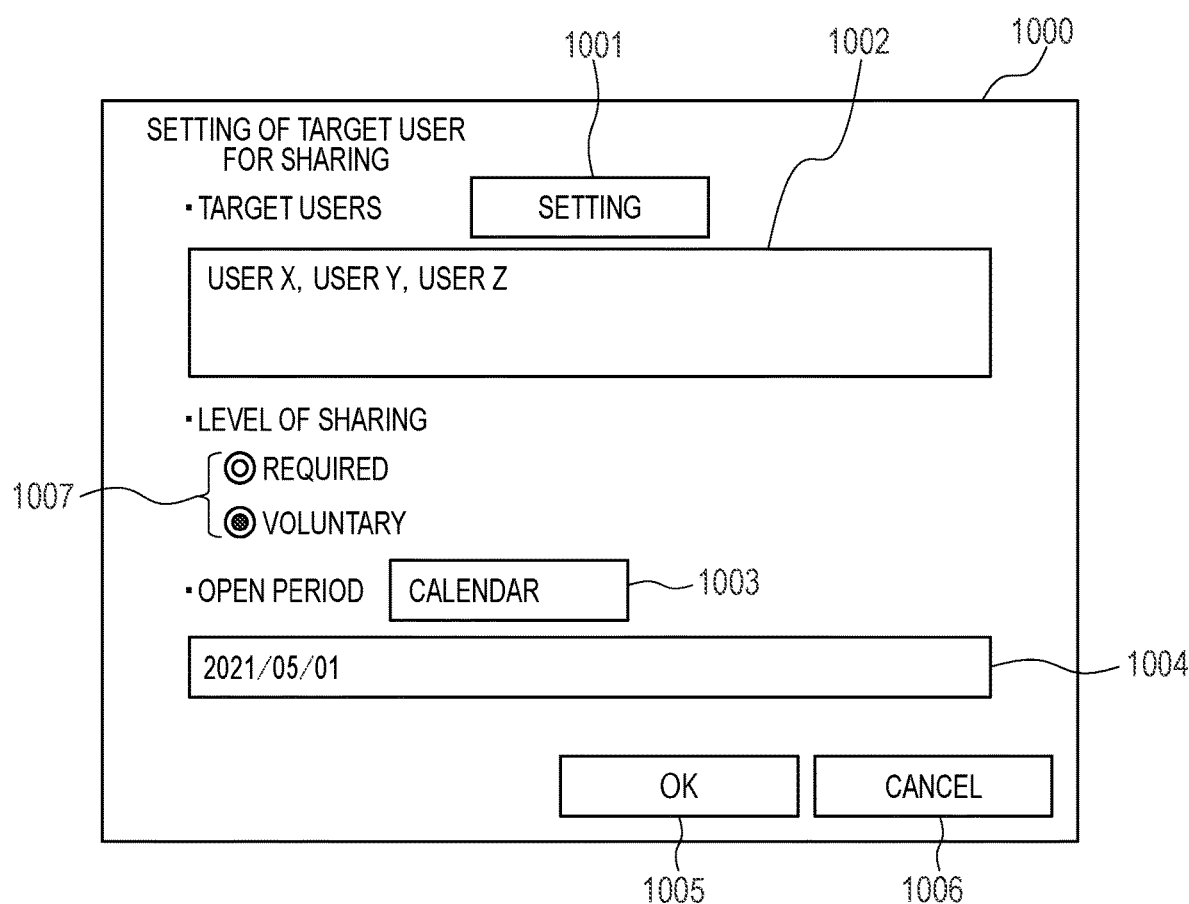
FIG. 10 is a diagram showing an example of a screen for setting a sharing target when sharing a print job.

In step S905, the client terminal 220 displays a setting screen for setting sharing targets of the print job and an open period in the display device 507. FIG. 10 is a diagram showing an example of a setting screen. Through a setting screen 1000, the user can set information and parameters such as target users of the print job execution, that is, users that the print job is shared with, and the open period, that is a time limit by which the target users are allowed to execute the printing operation.

Figure 11:
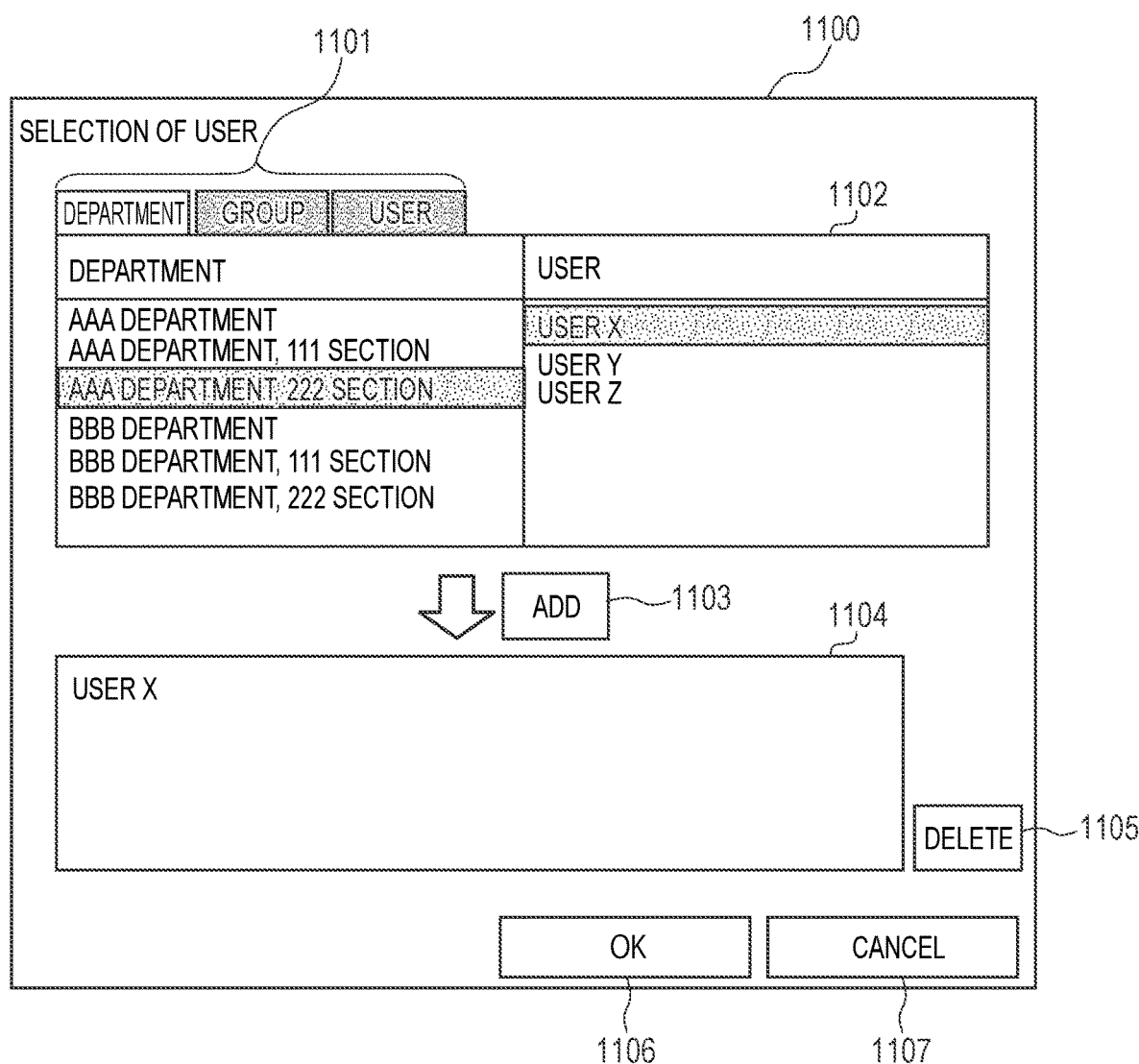
FIG. 11 shows an example of a screen for selecting a user from an administrative account.

If the user presses a setting button 1001, a user selection screen as shown in FIG. 11 is displayed. FIG. 11 will be described later. Users selected in the user selection screen are displayed in a target user list 1002.

Through an item of "sharing level 1007" shown in FIG. 10, the user can set whether or not the target users should execute the printing operation. The user selects "Required" if the target users are required to execute the printing operation. The user selects "Voluntary" if the target users are allowed to execute the printing operation as needed. In the example shown in FIG. 10, the sharing level 1007 set via the setting screen 1000 is applied to the users listed in the target user list 1002. However, the target user list 1002 may be displayed in two types of sharing levels "Required" and "Voluntary" so that the target users can be set for the respective sharing levels.

The target users can confirm the sharing level 1007 through a list of print jobs as shown in FIG. 13 displayed in the image forming apparatus 210. FIG. 13 will be described later.

The open period can be set by selecting the date from a calendar button 1003 or by directly inputting the period into an input field 1004 for the open period. If the open period is selected via the calendar button 1003, a calendar (not shown) is displayed in response to the user pressing the calendar button 1003, and the date selected on the calendar is input to the input field 1004 for the open period.

If an OK button 1005 is pressed, the sharing of the print job starts with the settings of the target user list 1002 and the input field 1004 for the open period. If a cancel button 1006 is pressed, the process returns to step S902.

FIG. 11 is a diagram showing an example of a user selection screen. A user selection screen 1100 is displayed on the display device 507. On the user selection screen 1100, users who share the print job can be selected from account information managed by the office tenant.

The user can select tabs 1101 including "Department", "Group", and "User". The user can switch a display of a user list field 1102 by selecting the tab. If the "Department" tab is selected on the tabs 1101, a list of departments managed by the office tenant and a list of users belonging to the selected department are displayed as shown in FIG. 11.

If the user selects the "Group" tab on the tabs 1101, a list of groups managed by the office tenant and a list of users who belong to the selected group are displayed. The content of the "Group" can be created, edited, and deleted by the tenant administrator.

Figure 12:
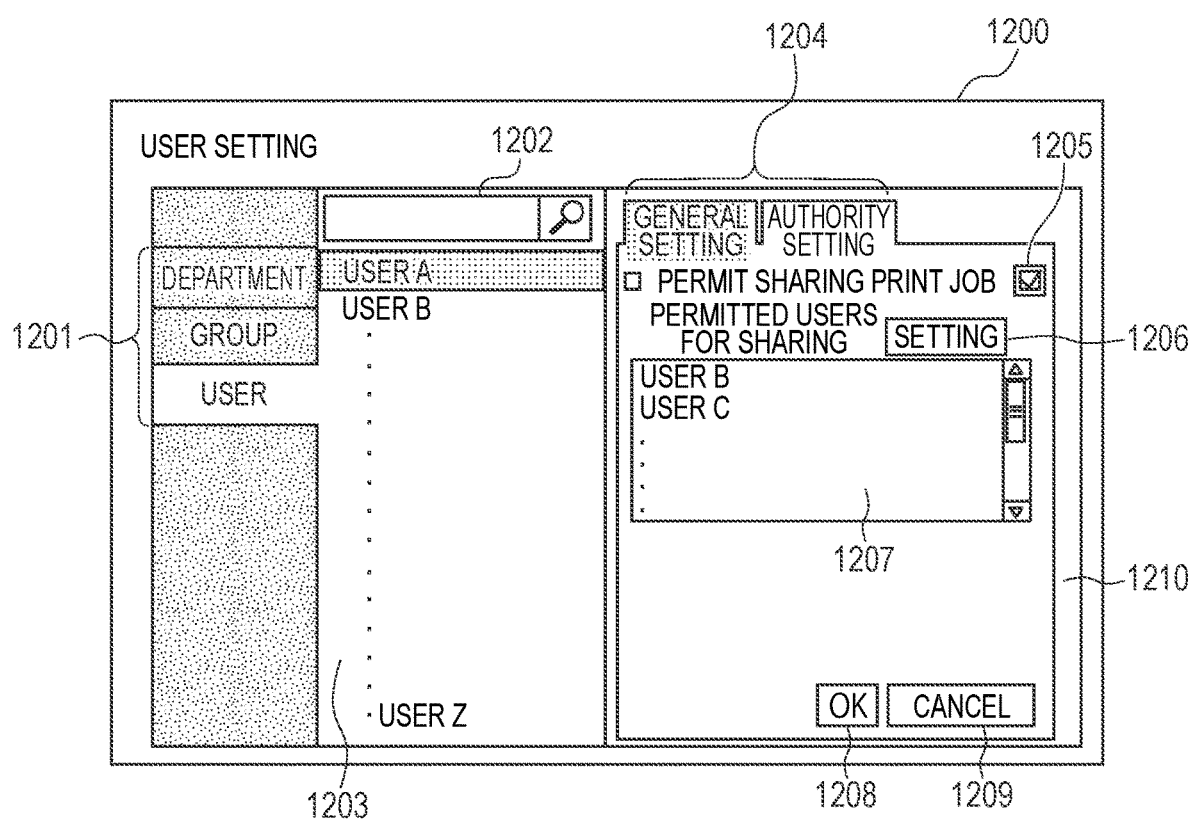
FIG. 12 shows an example of a screen for an administrator editing user settings of each account.

If the user selects the "User" tab on the tabs 1101, a list of all users managed by the office tenant is displayed. Users to be displayed in the user list field 1102 may be limited, for example, to only "shareable users". The "shareable user" is a user who can execute a print job, and the "shareable user" can be set by an administrator through an administration screen as shown in FIG. 12 accessible only by the administrator. In the present embodiment, it is considered that multiple "shareable users" are set, but the present invention is not limited thereto. FIG. 12 will be described later.

If an "add" button 1103 is pressed, users selected in the user list field 1102 are added to a selected user list 1104. In addition, if only a department or a group is selected without any user being selected, all users included in the selected department or in the selected group may be added.

If a delete button 1105 is pressed while a user displayed in the selected user list 1104 is selected, the selected user is deleted from the selected user list 1104.

If an OK button 1106 is pressed, the selected user list 1104 is validated. Specifically, for example, if the user selection screen 1100 is displayed in response to pressing the setting button 1001 of the setting screen 1000 shown in FIG. 10, the contents of the selected user list 1104 are reflected in the target user list 1002.

If a cancel button 1107 is pressed, the contents of the selected user list 1104 are not validated, and the screen returns to the previous screen, e.g., to the setting screen 1000.

FIG. 12 is a diagram showing an example of a user setting screen. Through a user setting screen 1200, an administrator can set users to be managed by the office tenant. Tabs 1201 of the user setting screen 1200 includes "Department", "Group", and "User" tabs, and the user can select one of the tabs to switch contents to be displayed in a user list 1203.

If the "Department" tab is selected from the tabs 1201, a list of departments managed by the office tenant and a setting field 1210 for the departments are displayed. if the "Group" tab is selected from the tabs 1201, a list of groups managed by the office tenant and a setting field 1210 for the groups are displayed. If the "User" tab is selected from the tabs 1201, a list of users managed by the office tenant and a setting field 1210 for the users are displayed.

The user list 1203 displays a list of departments, groups, or users depending on the tab selected from the tabs 1201.

If a character string is entered in a search bar 1202 to execute a search, only the corresponding items are displayed in the user list 1203. The setting of the users selected in the user list 1203 can be performed in the setting field 1210.

Setting item tabs 1204 allow to switch setting items. If a tab "General setting" is selected from the setting item tabs 1204, setting fields of information associated with a user such as a user name, an address and a department to which the user belongs (not shown) are displayed to edit the information associated with the user.

If a tab "Authority setting" is selected from the setting item tabs 1204, the user can set the authority of the users selected via the user list 1203. A check box 1205 allows to set whether to permit or prohibit the sharing of the print job. If permitted, the user can perform settings of the "shareable user" through a press of a setting button 1206. Pressing the setting button 1206 causes to display the user selection screen 1100 shown in FIG. 11 used for selecting the "shareable users". If the OK button 1106 is pressed in the user selection screen 1100, the selection is completed and reflected in a shareable user list 1207.

If an OK button 1208 is pressed, the authority setting of the user is validated. If a cancel button 1209 is pressed, the display is refreshed to the current setting without reflecting the authority setting of the users.

In step S906, the client terminal 220 transmits to the CPS 270 information including the print job, a name of the public printing tenant, a list of the target users set in step S905, the sharing level, and the open period. The CPS 270 performs the processes of steps S605 to S607, and transmits the print job to the target users executing the printing operation. When transmitting a print job to the target users executing the print operation, the user uses the access token of the user's own account. If the print job is shared, the user may change the setting not to transmit the print job to the target users executing the printing operation.

Figure 15:
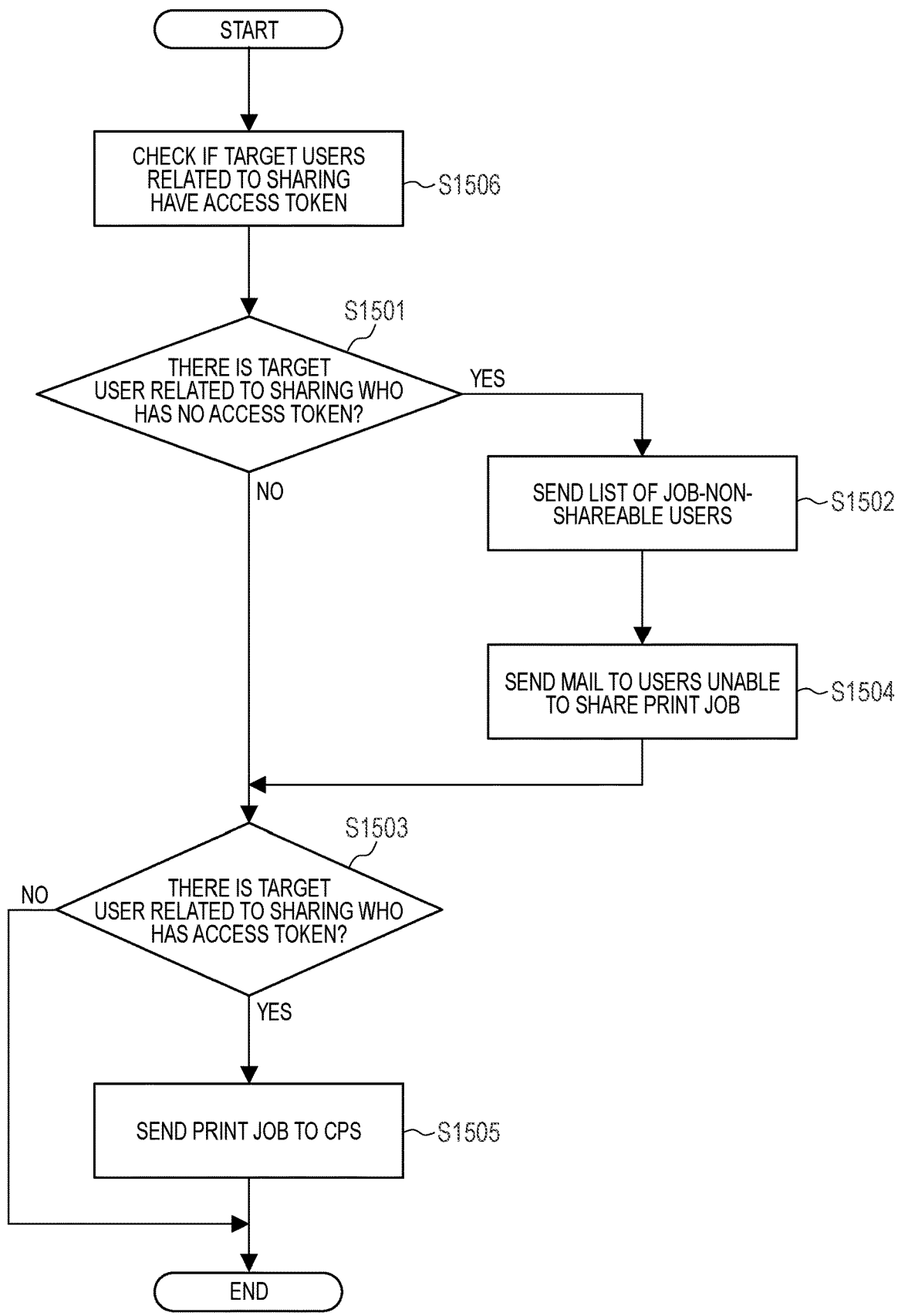
FIG. 15 is a flowchart showing an example of a process for sharing a print job by an office tenant according to the embodiment.

FIG. 15 is a flowchart showing an example of a processing procedure executed by the CPS 270 for sharing a print job with other users in the cloud printing service. The processing of this flowchart is started after the process of step S906 that causes the CPS 270 to receive information of a print job and a list of target users sharing the print job.

In step S1506, the authentication control unit 304 of the CPS 270 checks whether or not the authentication control unit 304 holds access tokens for each user included in the target user list 1002 received from the client terminal. The access token is issued by the processes of steps S403 to S405 shown in FIG. 4 and stored in the data storage unit 305 of the CPS 270 in step S406.

Still in step S1506, the authentication control unit 304 of the CPS 270 adds a user to a list of job-shareable users if an access token of the user is held. On the other hand, the authentication control unit 304 of the CPS 270 adds a user to a list of job-non-shareable users if an access token of the user is not held. The authentication control unit 304 of the CPS 270 holds the list of job-shareable users and the list of job-non-shareable users in the data storage unit 305 of the CPS 270.

In step S1501, the authentication control unit 304 of the CPS 270 determines whether or not there is a user who does not hold an access token. Specifically, for example, the authentication control unit 304 of the CPS 270 checks whether or not a user has been added to the list of the job-non-shareable users created in step S1506.

If the authentication control unit 304 of the CPS 270 determines that there is a user who does not hold an access token, the authentication control unit 304 stores the list of job-non-shareable users and information of the print job to be shared in the data storage unit 305 of the CPS 270, and proceeds to step S1502. The stored information of the print job to be shared is information such as a print job, a user name of the user who inputs the print job, a serial number, a URL of a public printing tenant, a sharing level, and an open period.

If the authentication control unit 304 of the CPS 270 determines that there is no user who does not hold an access token, the process proceeds to step S1503.

In step S1502, the communication unit 303 of the CPS 270 transmits information of the list of job-non-shareable users to the client terminal 220. When the client terminal 220 receives the list of job-non-shareable users, the client terminal 220 displays a message on display device 507 indicating that the print job to be shared cannot be transmitted to some of the target users. Specifically, a message like "unable to share the print job to <username enumerated here>. Sharing is enabled if the target users perform authentication to <a name of the public printing tenant>." is displayed.

In step S1504, the authentication control unit 304 of the CPS 270 refers to the accounts of the users included in the list of non-shareable users stored in the data storage unit 305 to obtain email addresses of the corresponding target users. Then, the communication unit 303 of the CPS 270 transmits emails to the corresponding target users. The mail may include a massage urging authentication like "<a name of the print job> has been shared by <a user name of the user executing the printing operation>. Receiving authentication from <a name of the public printing tenant> allows you to execute printing.", for example.

If the user who has received the mail in step S1504 operates the client terminal to perform the process same as the step S401 shown in FIG. 4, the processes same as the steps S402 to S407 are executed. When the authentication control unit 304 of the CPS 270 detects that an access token has been saved in step S406, the authentication control unit 304 of the CPS 270 refers to the list of job-non-shareable users stored in the data storage unit 305. If it is found out as a result of the referring process that the saved access token belongs to a user included in the list of job-non-shareable users, the process proceeds to step S1505.

In step S1503, the authentication control unit 304 of the CPS 270 determines whether or not there is a user holding an access token. Specifically, for example, the authentication control unit 304 of the CPS 270 checks whether or not a user has been added to the list of job-shareable users created in step S1506.

If the authentication control unit 304 of the CPS 270 determines that there is a user holding an access token, the process proceeds to step S1505. On the other hand, if the authentication control unit 304 of the CPS 270 determines that there is no user holding an access token, the process of this flow is terminated.

In step S1505, the CPS 270 performs the processes same as the steps S605 to S607 shown in FIG. 6 to transmit the print job to the user who has been added to the list of job-shareable users.

In step S605, the job management unit 302 of the CPS 270 duplicates the print job and issues a serial number for the duplicated print job (hereinafter the above serial number is referred to as a "duplicated serial number"). In step S606, the job management unit 302 of the CPS 270 stores a name of the user inputting the print job, an original serial number, the duplicated serial number, a URL of the public printing tenant, a share level, and an open period in the data storage unit 305.

In step S607, the communication unit 303 of the CPS 270 transmits the print job to the CPS 260 using access tokens of the target users stored in the data storage unit 305. At this time, the communication unit 303 of the CPS 270 transmits to the CPS 260 the print job, the original serial number, the duplicated serial number, the URL of the office tenant, the sharing level, the open period, and the access tokens of the target users.

The user who has shared the print job by the process shown in the flowchart of FIG. 15 can execute the printing operation by operating the image forming apparatus to execute the processes same as the steps S608 to S613 shown in FIG. 6. At this time, in steps S611 and S612, the image forming apparatus 210 requests the CPS 260 to provide the print job selected in step S610, and obtain the print job.

FIG. 13 is a diagram showing an example of a screen on the display device 517 of the image forming apparatus 210 for displaying the shared print jobs and the print jobs obtained in steps S611 and S612. A print job list screen 1300 is a user interface for displaying a list of print jobs obtained from the CPS 260. Here, the "shared print job" represents a print job for which a sharing target is set.

Print jobs 1321, 1322, and 1323 represent print jobs obtained from the CPS 260, respectively. For each print job, a job name 1301, a sharing level 1307, an open period 1308, a print format 1302, a color 1303, a size 1304, a number of pages 1305, and date and time 1306 on which a print job is input are displayed. The contents of the sharing level 1007 and the input field 1004 for open period for the sharing target that have been set via the setting screen 1000 when the print job was shared are displayed in the sharing level 1307 and the open period 1308, respectively. In case of a normal print job that is not shared with other users, cells for the sharing level and the open period may be displayed with e.g., "-" or the cells may be blank indicating that no parameter is specified for the sharing level and the open period, as shown in the row for the print job 1321. The user may select any of the print jobs 1321, 1322 and 1323, and the selected print job may show a selected state by changing a color of the selected job, as shown in the print job 1322, for example.

The respective buttons of the print button 1311 to the return button 1317 shown in the lower part of the print job list screen 1300 have a function same as the respective buttons of the print button 811 to the return button 817 of FIG. 8 described above, so that descriptions thereof will be omitted.

The open period of the print job is managed by the job management unit 302 of the CPS 270. If the open period expires, the job management unit 302 requests the CPS 260 to delete the print job. Upon receiving the request of deleting the print job, the CPS 260 deletes the target print job managed by the job management unit 302. If the CPS 260 is configured not to accept a request of deleting print jobs, the job management unit 302 of the CPS 260 may be configured to manage the open period to delete the print job.

The user who shared a print job can also stop sharing the print job regardless of the open period.

Figure 14:
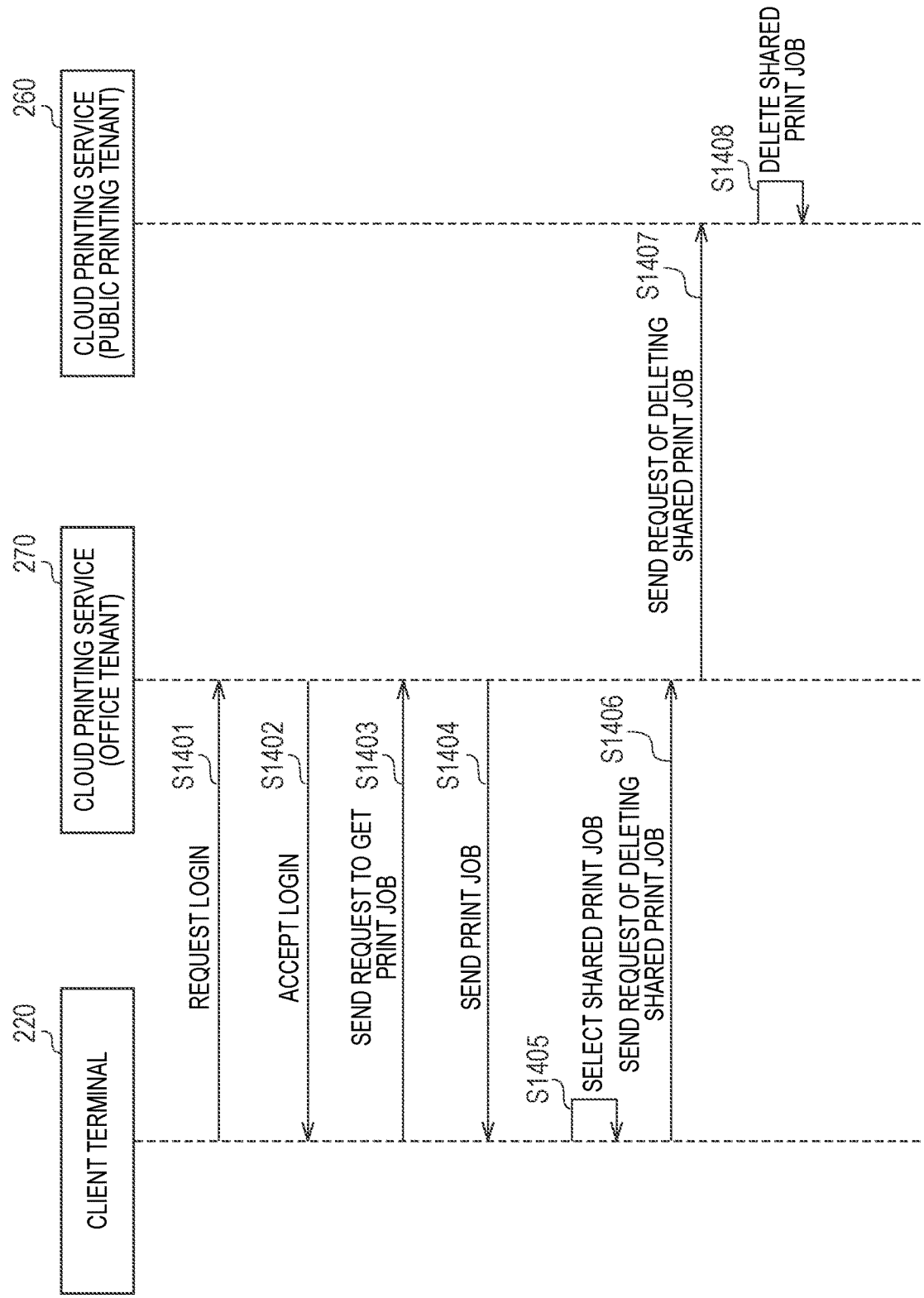
FIG. 14 is a sequence diagram showing an example of a process for stopping sharing of shared print job.

FIG. 14 is a sequence diagram showing an example of processing for stopping sharing a print job that has been shared by the user when the user wants to cancel the sharing of the print job. The processing of this sequence is initiated by the user entering information for login to the CPS 270 via the client terminal 220.

The processes of the steps S1401 and S1402 are same as the steps S601 and S602, respectively, described above with reference to FIG. 6.

In step S1403, the client terminal 220 transmits a request for obtaining a print job to the CPS 270 via the communication device 505. The print job to be obtained may be limited to only the shared print job.

In step S1404, upon receiving the request for obtaining the print job from the client terminal 220, the communication unit 303 of the CPS 270 transmits a list of target print jobs to the client terminal 220.

In step S1405, the client terminal 220 displays the list of the print jobs obtained in step S1404 on the display device 507. The user selects a shared print job to be deleted from the displayed list of print jobs.

In step S1406, the client terminal 220 transmits a request for deleting the shared print job to the CPS 270 via the communication device 505.

In step S1407, the job management unit 302 of the CPS 270 searches for the duplicated serial number linked with the original serial number. The communication unit 303 of the CPS 270 transmits the request for deleting the shared print job to the CPS 260 using the original serial number and the access token linked with the duplicated serial number.

In step S1408, the job management unit 302 of the CPS 260 deletes the print job associated with the serial number that is received from the CPS 270.

As described above, according to the present embodiment, creating a print job for each user sharing the print job and managing the print job allows to share the print job even if the account information used when inputting a print job is different from the account information used when executing the print operation. Further, according to the present embodiment, it is not necessary to associate the accounts between different cloud printing services. Thus, the present embodiment also allows to reduce the time and efforts required for the user to input account information at the time of executing the printing operation.

According to the present invention, in a printing system where multiple cloud printing services are collaborating with each other, it is possible to reduce time and efforts for inputting account information in case of multiple users sharing a print job.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-160919 filed on Sep. 30, 2021 which is hereby incorporated by reference herein in its entirety.

What is claimed is:

1. A cloud printing system connected to an information processing apparatus via a network, the cloud printing system comprising:

one or more memories storing a set of instructions; and
one or more processors that execute the set of instructions to:
- receive a print job from the information processing apparatus; and
- if there is a plurality of users permitted to execute the received print job, transmit the received print job to another cloud printing system using authentication information of each of the plurality of users.

2. The cloud printing system according to claim 1, wherein the one or more processors further execute the set of instructions to determine whether or not to hold the authentication information of each of the plurality of users,
- wherein the print job is transmitted to said another cloud printing system using authentication information of a first user determined to be held.

3. The cloud printing system according to claim 2, wherein the one or more processors further execute the set of instructions to obtain authentication information of a second user determined to not be held.

4. The cloud printing system according to claim 3, wherein the one or more processors further execute the set of instructions to notify the second user whose authentication information is not held that the authentication information of the second user is not held,
- wherein, if the authentication information of the second user is obtained after the notification, the print job is transmitted to said another cloud printing system using the obtained authentication information of the second user.

5. The cloud printing system according to claim 1, wherein the one or more processors further execute the set of instructions to obtain setting information about the plurality of users permitted to execute the received print job from the received print job.

6. The cloud printing system according to claim 5,
- wherein the setting information includes a setting about a time limit of the print job,
- wherein, if a time limit of the print job transmitted to said another cloud printing system has expired, the one or more processors further execute the set of instructions to request said another cloud printing system to delete the expired print job.

7. The cloud printing system according to claim 1, wherein the authentication information is an access token.

8. A method of controlling a cloud printing system connected to an information processing apparatus via a network, the method comprising:
- receiving a print job from the information processing apparatus; and
- if there is a plurality of users permitted to execute the received print job, transmitting the received print job to another cloud printing system using authentication information of each of the plurality of users.

* * * * *